(12) United States Patent
Stojkovic et al.

(10) Patent No.: US 9,931,920 B1
(45) Date of Patent: Apr. 3, 2018

(54) VEHICLE ROOF ASSEMBLY

(71) Applicant: Ford Global Technologies, LLC, Dearborn, MI (US)

(72) Inventors: Dragan B. Stojkovic, Taylor, MI (US); Ronald M. Lovasz, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/374,020

(22) Filed: Dec. 9, 2016

(51) Int. Cl.
  *B60J 7/11* (2006.01)
  *B60J 7/19* (2006.01)

(52) U.S. Cl.
  CPC .................. *B60J 7/11* (2013.01); *B60J 7/194* (2013.01)

(58) Field of Classification Search
  CPC .................. B60J 7/11; B60J 7/194
  USPC .................. 296/216.01–224
  See application file for complete search history.

(56) References Cited

U.S. PATENT DOCUMENTS

| | | | | |
|---|---|---|---|---|
| 2,190,462 A | * | 2/1940 | Votypka | B60J 7/043 296/213 |
| 4,126,352 A | * | 11/1978 | Vogel | B60J 7/1642 296/218 |
| 4,178,036 A | * | 12/1979 | Kalitz | B60J 7/194 296/222 |
| 4,257,632 A | * | 3/1981 | DeStepheno | B60J 7/1642 292/263 |
| 4,723,812 A | * | 2/1988 | Masuda | B60J 7/11 292/263 |
| 4,729,596 A | * | 3/1988 | Fujihara | B60J 7/106 16/380 |
| 6,039,391 A | * | 3/2000 | Takahashi | B60J 7/11 296/218 |
| 6,981,738 B2 | | 1/2006 | Schönebeck et al. | |
| 7,032,962 B2 | * | 4/2006 | Engelgau | B60J 1/183 296/216.05 |
| 7,213,854 B2 | * | 5/2007 | Dowdey | B60J 7/11 296/218 |
| 8,672,398 B2 | | 3/2014 | Gruss et al. | |

FOREIGN PATENT DOCUMENTS

| | | |
|---|---|---|
| GB | 2209181 A | 5/1989 |
| JP | H5278470 A | 10/1993 |
| JP | 6166327 A | 6/1994 |

\* cited by examiner

*Primary Examiner* — Dennis H Pedder

(74) *Attorney, Agent, or Firm* — Jason C. Rogers; Bejin Bieneman PLC

(57) ABSTRACT

A roof assembly includes a vehicle body defining an opening and having a track extending along the opening. The track is elongated along a track axis. The roof assembly includes a panel removably disposed in the opening, a latch attached to the panel and releasably engageable with the vehicle body, and a block attached to the panel and removably engageable with the track. The block is rotatable relative to the panel about a block axis perpendicular to the track axis.

20 Claims, 9 Drawing Sheets

VEHICLE ROOF ASSEMBLY

BACKGROUND

One type of roof assembly for a vehicle may be solid, i.e., without openings. In this instance, the roof assembly separates an interior of the vehicle from an outside environment. Another type of roof assembly may include a removable panel such that, when the panel is removed, the roof assembly includes an opening. In this instance, the roof assembly may only partially separate, or not separate, the interior of the vehicle from the outside environment.

DETAILED DESCRIPTION

Figure 1:
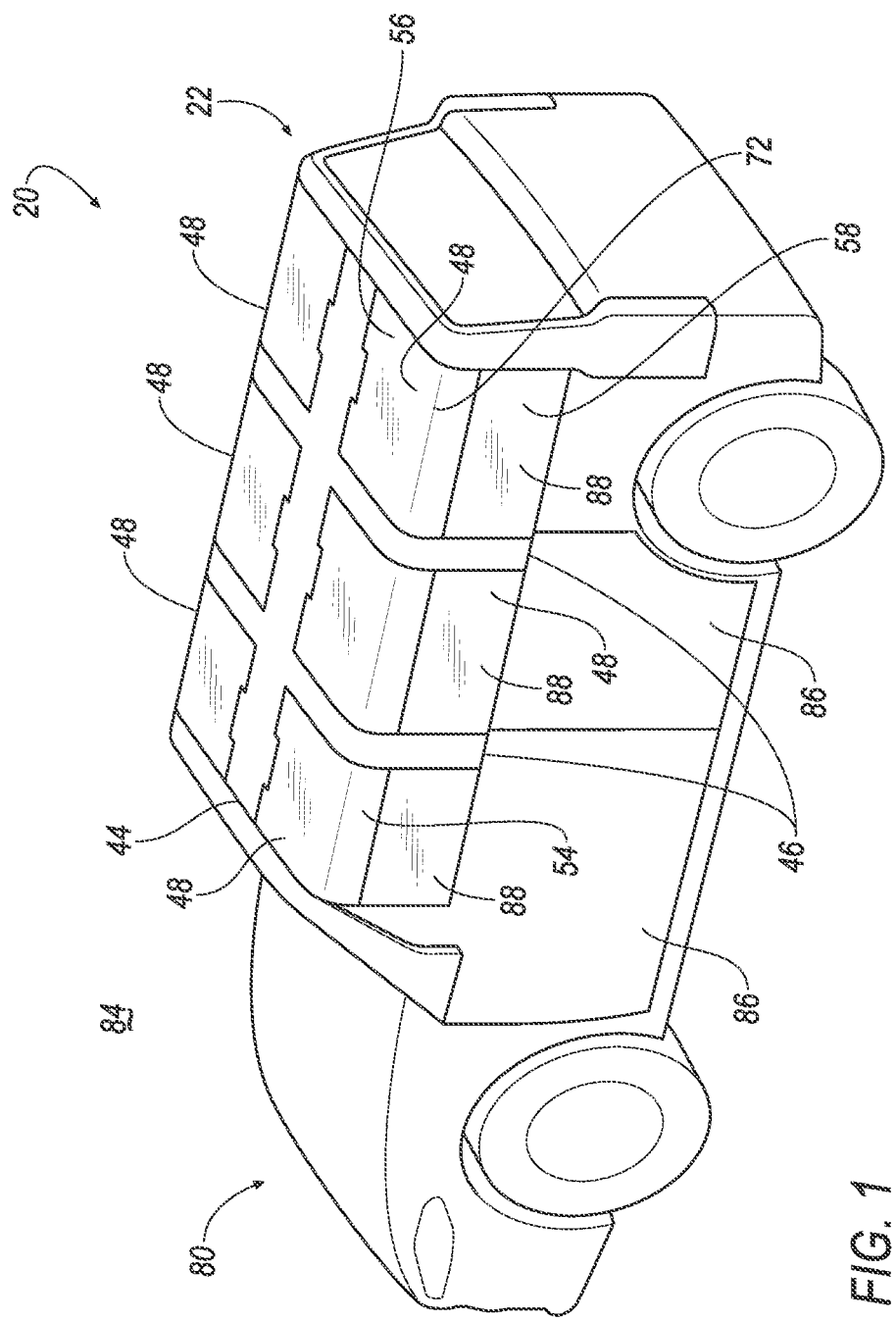
FIG. 1 is a perspective view of a vehicle including a vehicle body and a plurality of vehicle panel assemblies engaged with the vehicle body.

With reference to the Figures, wherein like numerals indicate like parts throughout the several views, a roof assembly 20 for a vehicle 80 is generally shown. The roof assembly 20 includes a vehicle body 22 defining an opening 24 and having a track 26 extending along the opening 24. The track 26 is elongated along a track axis 28. The roof assembly 20 includes a panel 48 removably disposed in the opening 24. The roof assembly 20 includes a latch 50 attached to the panel 48 and releasably engageable with the vehicle body 22, and a block 62 attached to the panel 48 and removably engageable with the track 26. The block 62 is rotatable relative to the panel 48 about a block axis 64 perpendicular to the track axis 28.

The roof assembly 20 allows for selective removal of the panel 48 from the opening 24 to configure the vehicle 80 into a variety of configurations. When the panel 48 is disposed in the opening 24, the panel 48 separates an interior 82 of the vehicle 80 from an outside environment 84. Alternatively, when the panel 48 is removed from the opening 24, the interior 82 of the vehicle 80 is exposed to the outside environment 84 through the opening 24. In other words, the removability of the panel 48 allows the interior 82 to either be shielded from the outside environment 84, or partially exposed to the outside environment 84. The panel 48 may engage the vehicle body 22 by inserting the block 62 into the track 26 and sliding the block 62 along the track 26. With the block 62 retained in the track 26, the panel 48 may be rotated about the block 62 to close the panel 48 across the opening 24, as discussed further below.

Figure 2:
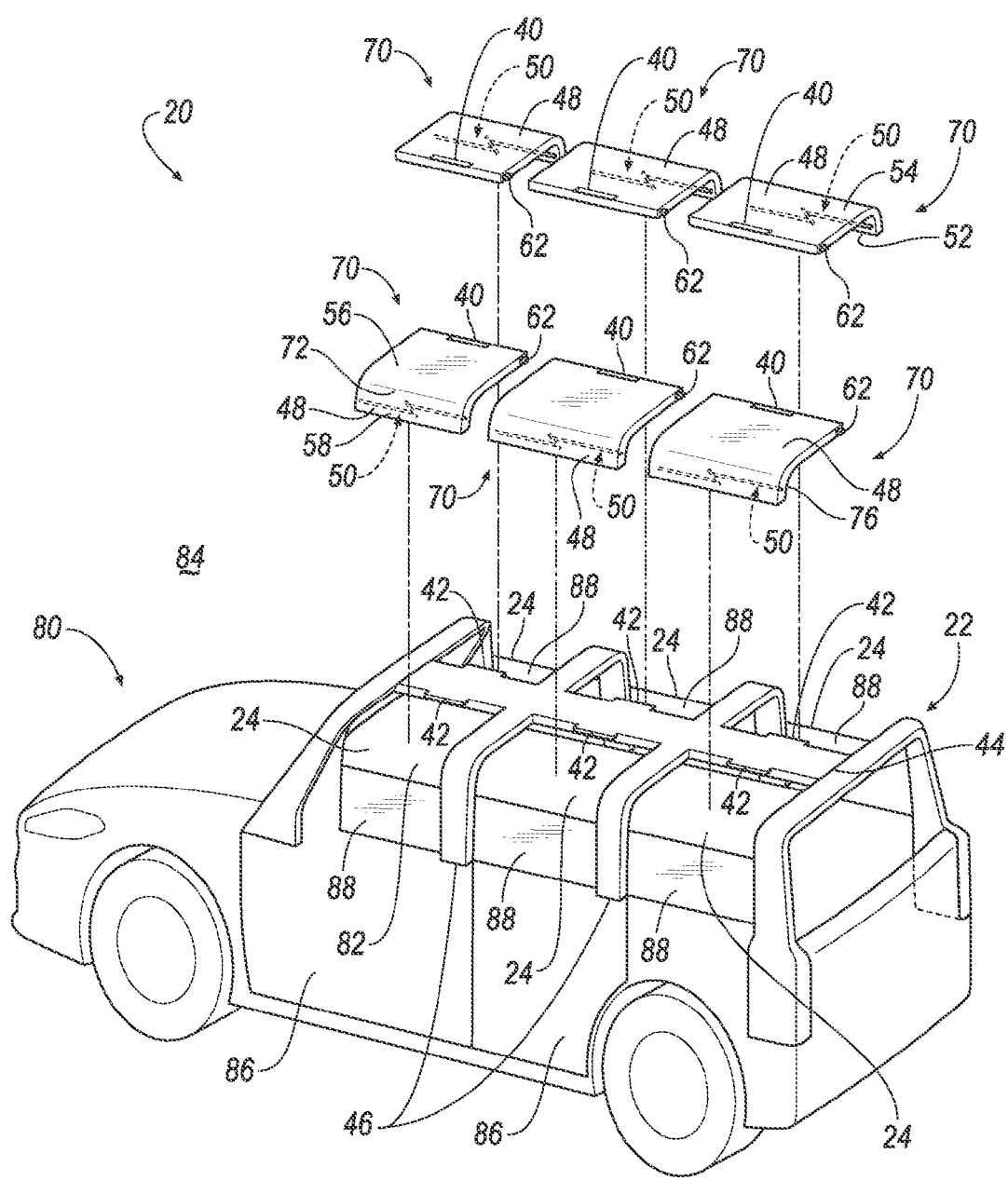
FIG. 2 is a perspective view of the vehicle with the vehicle panel assemblies disengaged with the vehicle body.

With reference to FIGS. 1 and 2, a panel assembly 70 of the roof assembly 20 includes the panel 48, the latch 50, and the block 62. The roof assembly 20 may include more than one panel assembly 70. For example, the roof assembly 20 shown in FIGS. 1 and 2 includes six panel assemblies 70. Each of these panel assemblies 70 may be identical, or nearly identical to each other, and common numerals are used to identify common features.

The vehicle 80 may be, for example, any type of passenger automobile. The vehicle body 22 may be of a unibody construction in which an underlying frame (not shown) and the vehicle body 22, are unitary, i.e., a continuous one-piece unit. As another example, the vehicle body 22 may be of a body-on-frame construction (also referred to as a cab-on-frame construction). In other words, the vehicle body 22 and the frame of the vehicle 80 are separate components, i.e., are modular, and the vehicle body 22 is supported on and affixed to the frame. Alternatively, the vehicle body 22 and the frame may have any suitable architecture. The vehicle body 22 and/or the frame may be formed of any suitable material, for example, steel, aluminum, plastic, fiber-reinforced composite, etc.

With continued reference to FIGS. 1 and 2, the vehicle body 22 may include a backbone 44 and a pair of beams 46 extending in a common direction from the backbone 44, e.g., the pair of beams 46 may extend parallel to one another from the backbone 44. The backbone 44 and the pair of beams 46 define the opening 24. The backbone 44 and the pair of beams 46 may be unitary, i.e., a continuous one-piece unit. As another example, the backbone 44 and the pair of beams 46 may be separate components, i.e., formed separately and subsequently attached together. Alternatively, the backbone 44 and the pair of beams 46 may have any suitable construction. The backbone 44 and the pair of beams 46 may be formed of any suitable material, for example, steel, aluminum, plastic, fiber-reinforced composite, etc. The backbone 44 and the pair of beams 46 may be formed by any suitable process, for example, extrusion, machining, roll forming, etc.

The vehicle body 22 may include a door 86 having a window 88. For example, the vehicle body 22 shown in FIGS. 1 and 2 includes four doors 86. The vehicle body 22 may include additional windows fixed to the rest of the vehicle body 22, i.e., side lite windows. The window 88 may be retractable into the door 86 or the vehicle body 22.

The door 86 may be of any suitable material, for example, steel, aluminum, plastic, fiber-reinforced composite, etc. The window 88 may be of any suitable material, for example, glass, polycarbonate, metal (such as aluminum or steel), etc. The window 88 may be any suitable level of transparency, for example, transparent, partially transparent (e.g., transparent with masking, tinting, etc.), etc.

Figure 3:
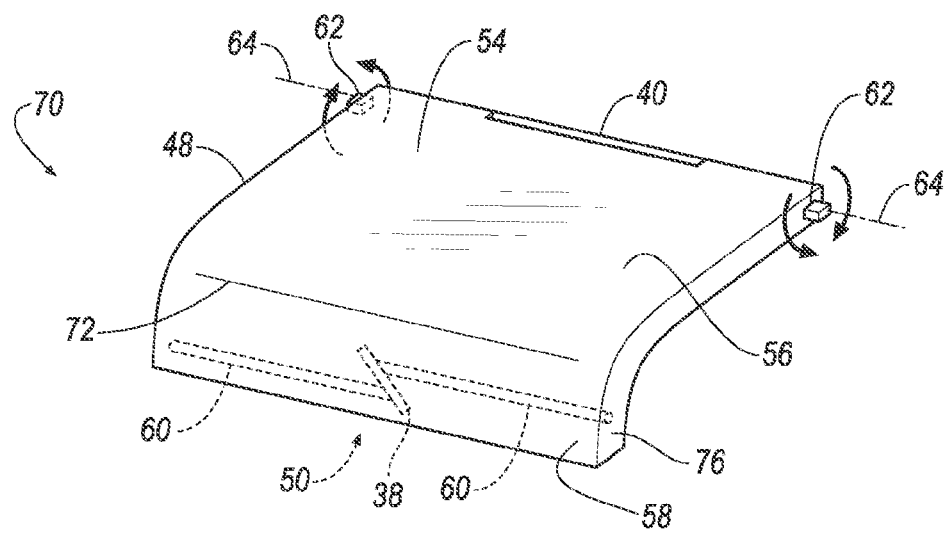
FIG. 3 is a perspective view of one of the vehicle panel assemblies disengaged with the vehicle body.
Figure 3:
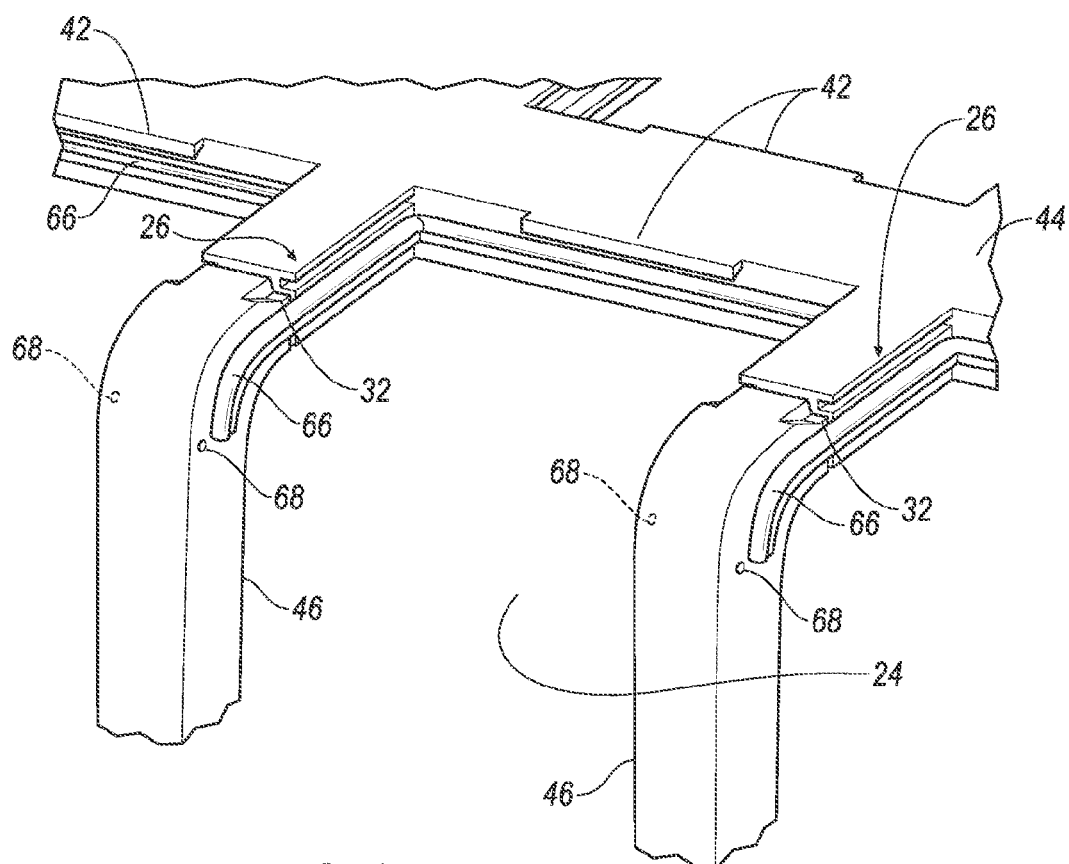
Figure 4:
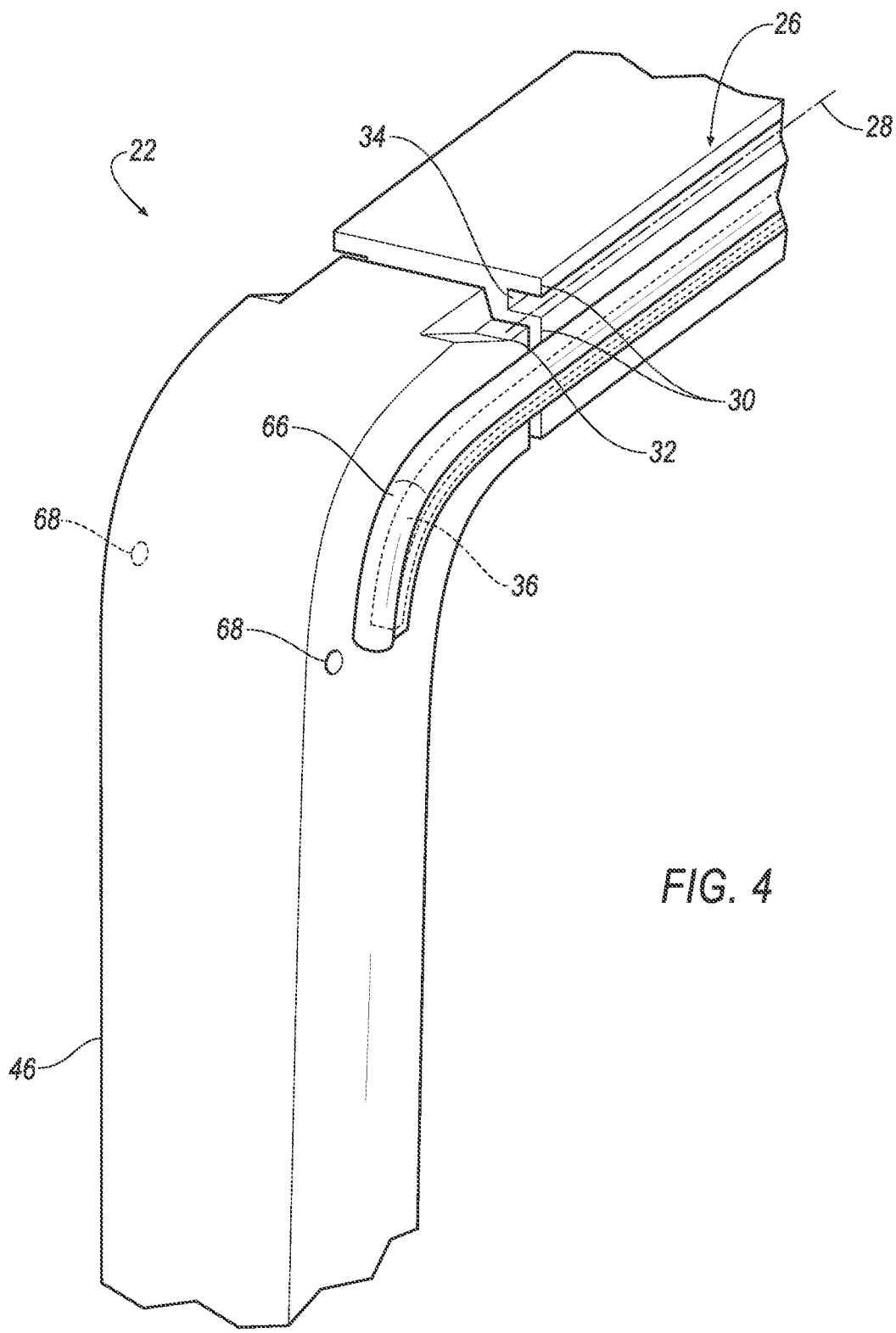
FIG. 4 is a perspective view of part of the vehicle body.

With reference to FIGS. 3 and 4, the track 26 of the vehicle body 22 extends along the opening 24 and along the track axis 28. For example, one of the pair of beams 46 may include the track 26, and the track 26 extends along the opening 24 to the backbone 44. Each beam 46 on opposite sides of the opening 24 may define tracks 26, and the panel assembly 70 may include two blocks 62 engageable with the tracks 26, respectively, as set forth further below. Common numerals are used to identify common features for each pair of tracks 26/blocks 62.

As set forth above, the block 62 is removably engaged with the track 26. With continued reference to FIGS. 3 and 4, the track 26 includes two walls 30 and a channel 34 between the two walls 30. That is, the two walls 30 are opposite each other, and the channel 34 is positioned between the two walls 30. The track 26 is designed to receive the block 62. For example, the walls 30 are spaced from each other by a distance such that the track 26 slideably receives the block 62 and such that the walls 30 prevent rotation of the block 62 relative to the walls 30.

Figure 6A:
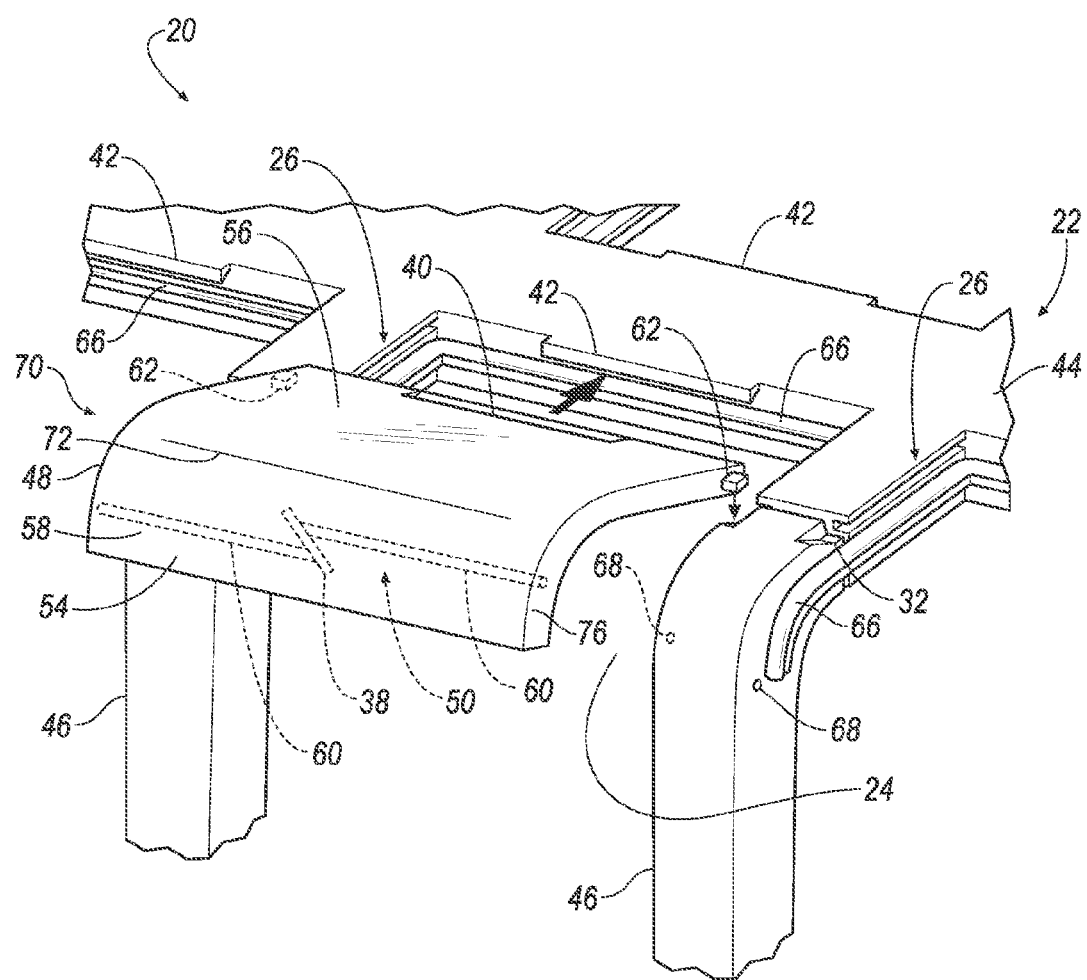
FIG. 6A is a perspective view of one of the vehicle panel assemblies engaged with the vehicle body.
Figure 6B:
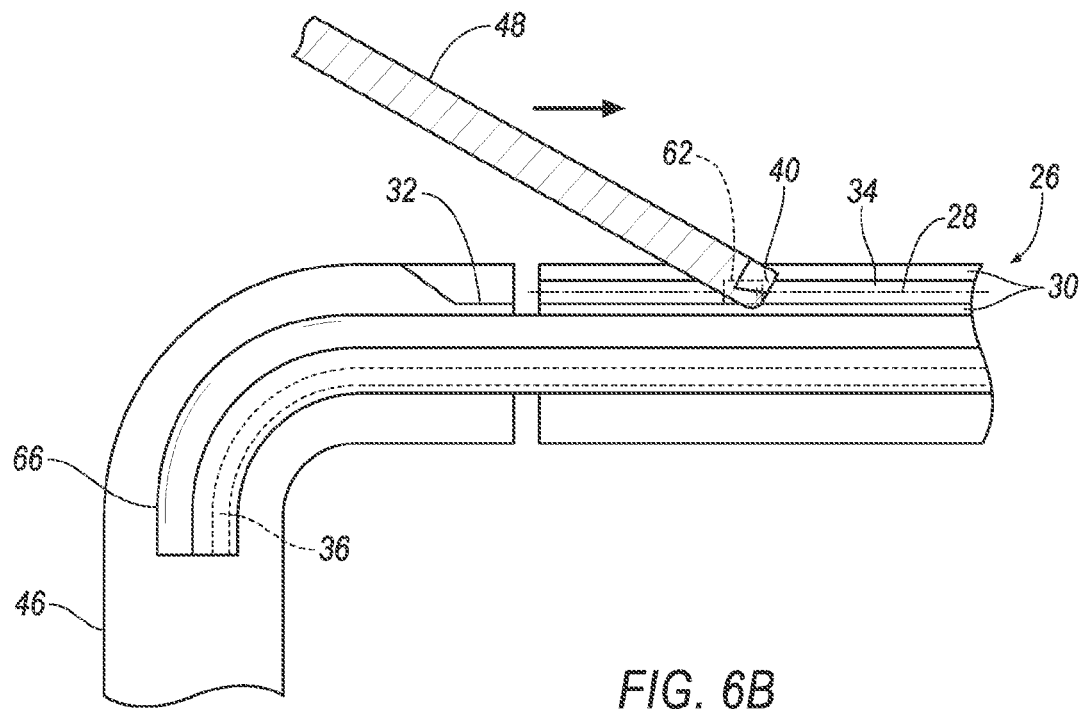
FIG. 6B is a cross-sectional view of one of the vehicle panel assemblies engaged with the vehicle body.
Figure 6C:
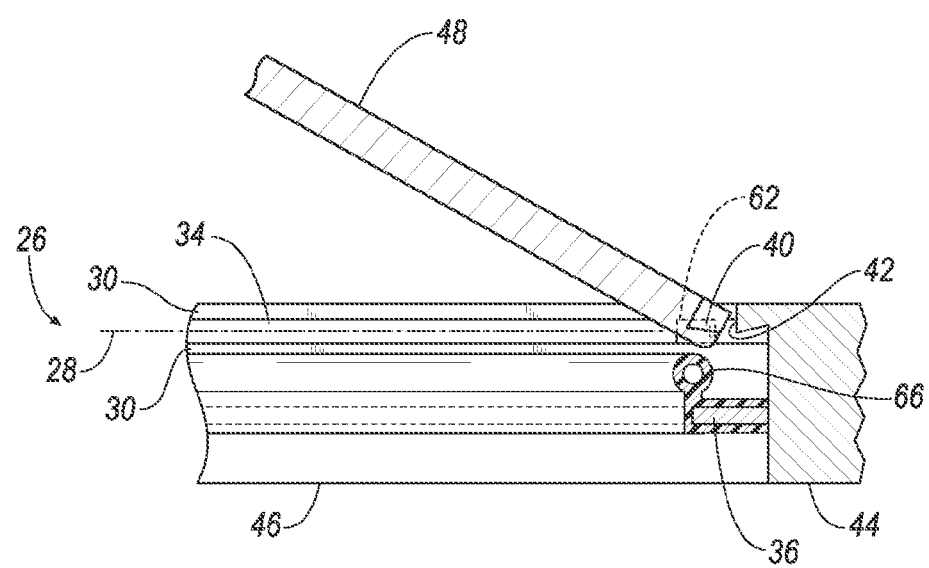
FIG. 6C is a cross-sectional view of one of the vehicle panel assemblies engaged with the vehicle body.

One of the walls 30 of the track 26 includes a slot 32 extending into the channel 34. The block 62 may be inserted into the slot 32 to feed the block 62 into the channel 34, as shown in FIG. 6A. When the block 62 is in the channel 34, the panel assembly 70 may be slid along the track 26 from the slot 32 to a seated position, as shown in FIG. 6C. The slot 32 may, for example, be at an end of one of the walls 30, or the slot 32 may be at any other suitable location in one of the walls 30.

The slot 32 is designed to receive the block 62. For example, a width of the block 62 may be less than a width of the slot 32. Additionally, a height of the block 62 may be less than a height of the channel 34. Accordingly, the block 62 may be inserted into the channel 34 through the slot 32.

Figure 7A:
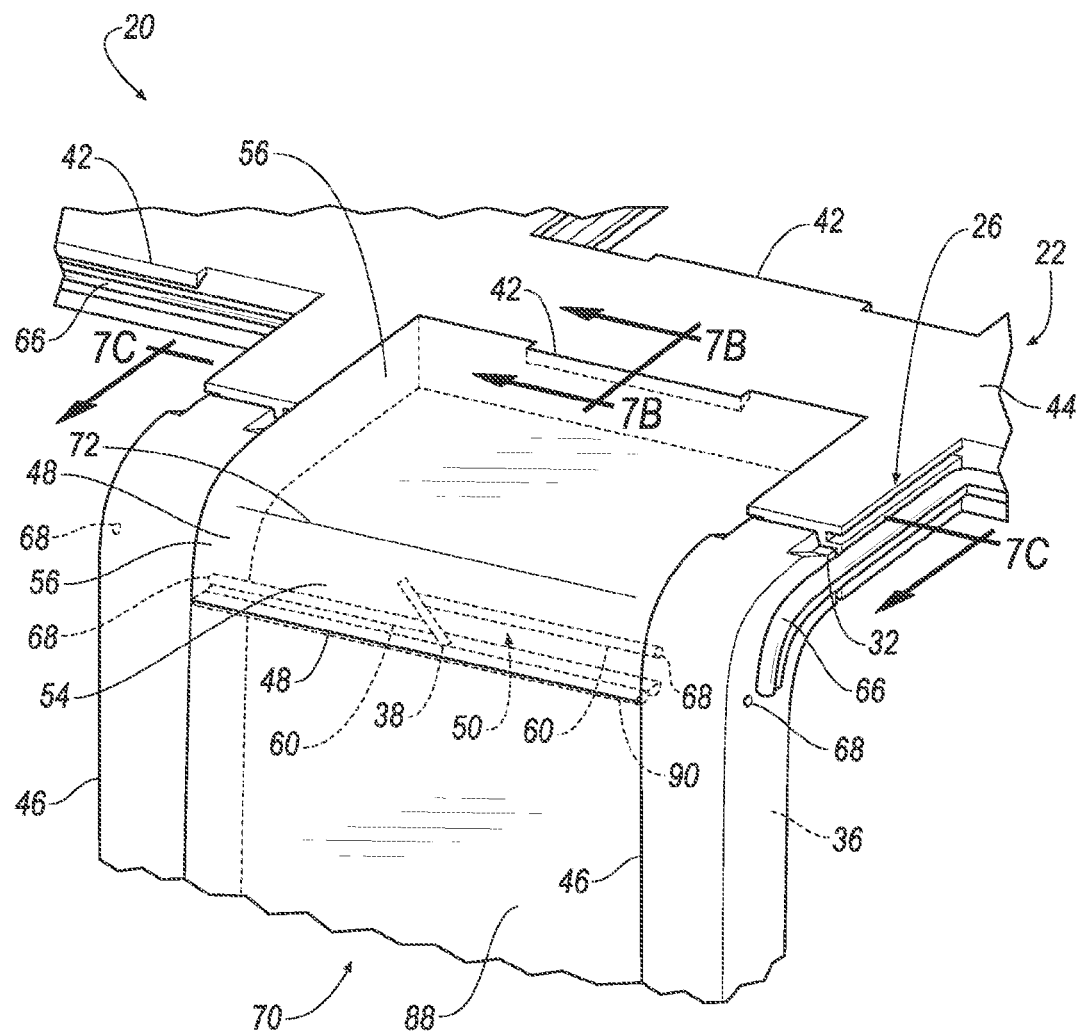
FIG. 7A is a perspective view of one of the vehicle panel assemblies engaged with the vehicle body.
Figure 7B:
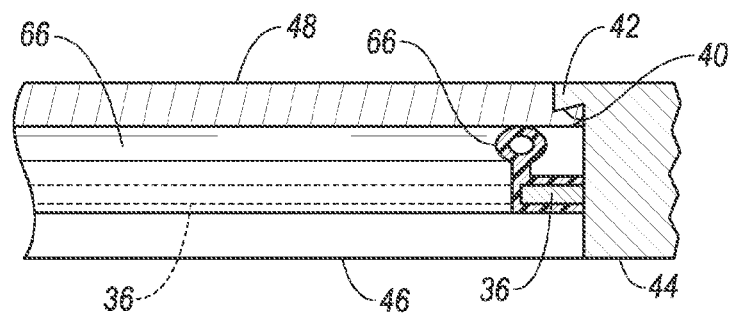
FIG. 7B is a cross-sectional view of one of the vehicle panel assemblies engaged with the vehicle body along line 7B in FIG. 7A.
Figure 7C:
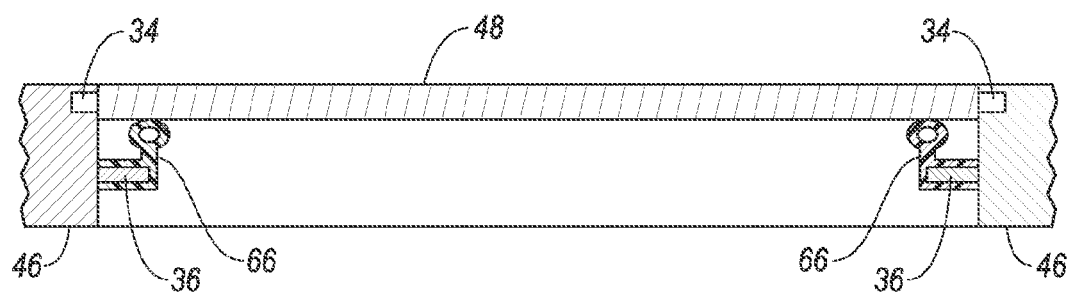
FIG. 7C is a cross-sectional view of one of the vehicle panel assemblies engaged with the vehicle body along line 7C in FIG. 7A.

As set forth above, the panel 48 is removably disposed in the opening 24. For example, the panel 48 may be disposed in the opening 24 as shown in FIG. 1, and the panel 48 may be removed from the opening 24 as shown in FIG. 2. Specifically, the block 62 may be engaged with and disengaged with the track 26. When the block 62 is engaged with the track 26, the panel 48 is rotatable relative to the vehicle body 22. Specifically, the panel 48 may be rotated relative to the block 62 and the vehicle body 22 between an open position, as shown in FIGS. 6B-6C, and a closed position, as shown in FIGS. 7A-7C. More specifically, the panel 48 is rotatable relative to the block 62 and the vehicle body 22 when the panel assembly 70 is in the seated position, which is shown in FIG. 6C.

The panel assembly 70, for example, may include two blocks 62, as set forth above, and each track 26 may include the slot 32. The two slots 32 about the opening 24 are spaced from each other by a distance equal to a distance from one of the blocks 62 to the other of the blocks 62. This equal spacing allows each slot 32 to receive one of the blocks 62. Additionally, each track 26 includes the channel 34, and the two channels 34 extend parallel to one another to allow the blocks 62 to slide along the channels 34.

With reference to FIGS. 2 and 3, the panel 48 includes a first catch 40, and the vehicle body 22 includes a second catch 42. The first catch 40 and the second catch 42 are removably engageable with each other, i.e., removable by hand and without the use of tools, etc. The first catch 40 and the second catch 42 are aligned with each other when the panel assembly 70 is in the seated position, as shown in FIG. 6C. The first catch 40 and the second catch 42 are configured, e.g., positioned, sized, and shaped, to engage each other as the panel 48 is rotated to the closed position. The first catch 40 and the second catch 42, along with the latch 50, releasably retain the panel assembly 70 in the closed position and affix the panel assembly 70 to the vehicle body 22 during operation of the vehicle 80.

The first catch 40, for example, may be a notch, and the second catch 42 may be a boss. Alternatively, the first catch 40 may be a boss, and the second catch 42 may be a notch. Alternatively, the first catch 40 and the second catch 42 may be of any suitable type for engaging the panel 48 with the vehicle body 22.

When the roof assembly 20 is in the closed position, as shown in FIGS. 7A-7C, the latch 50 is engageable with the vehicle body 22. For example, the latch 50 may be a three-point locking mechanism, i.e., the vehicle body 22 may include holes 68, and the latch 50 may include pins 60 engageable with the holes 68, and a handle 38 rotatably attached to the panel 48. The handle 38 may interface with the pins 60 such that when the handle 38 is rotated, the handle 38 pushes the pins 60 toward the vehicle body 22 until the pins 60 engage with the holes 68. The latch 50 described above, i.e., the three-point locking mechanism, may be of any suitable type, for example, a swing latch, J-hook, etc.

With continued reference to FIGS. 3 and 4, the roof assembly 20 includes a seal 66 between the vehicle body 22 and the panel 48, i.e., the seal 66 extends from the vehicle body 22 to the panel 48. For example, the vehicle body 22 may include a flange 36 extending along the opening 24 and the seal 66 extends between the flange 36 and the panel 48. For example, the seal 66 may attach to the flange 36, and, when the panel 48 is disposed in the opening 24 and the first catch 40 and the second catch 42 are engaged with each other, the seal 66 may extend from the panel 48 to the flange 36 (as shown in FIGS. 7A-7C). The flange 36 and the seal 66 are spaced from the channel 34. For example, when the panel 48 is disposed in the opening 24, but before the first catch 40 and the second catch 42 are engaged with each other, the panel 48 does not contact the flange 36 and the seal 66 (as shown in FIGS. 6A-6C). The seal 66 may be formed of any suitable material, for example, rubber, silicone, vinyl, etc. Additionally, the seal 66 may include a coating of any suitable type and material.

While the block 62 slides along the track 26 when the panel 48 is in the open position, the panel 48 does not contact the seal 66. By sliding along the track 26, as opposed to the seal 66, there is no friction between the panel 48 and the seal 66; thus, reducing damage to the seal 66. As the panel 48 is rotated relative to the block 62 and the vehicle body 22 to the closed position, the panel 48 contacts the seal 66 and compresses the seal 66 between the panel 48 and the flange 36.

Figure 5:
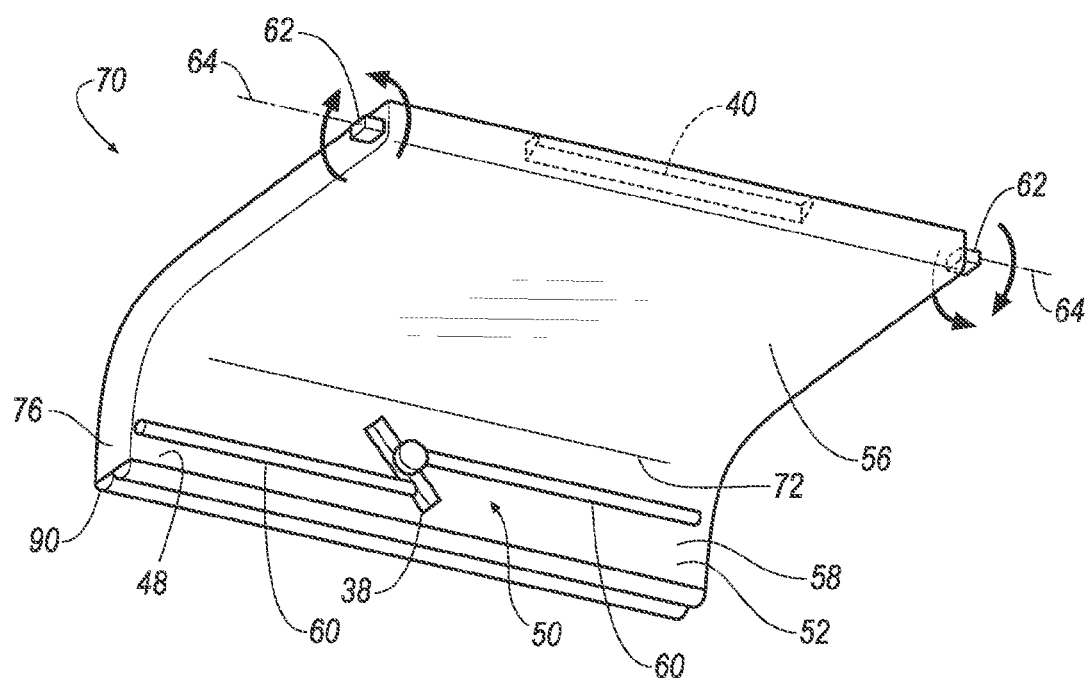
FIG. 5 is a perspective view of one of the vehicle panel assemblies.

With continued reference to FIGS. 3 and 5, the panel 48 includes a first portion 56, a second portion 58, and a curved portion 72 curvedly extending from the first portion 56 to the second portion 58. In other words, the panel 48 may be L-shaped. When the panel assembly 70 is in the closed position, as shown in FIGS. 7A-C, the first portion 56 is planar along the track axis 28, and the second portion 58 extends transversely from the first portion 56. Alternatively, the panel 48 may be flat, slightly curved/cupped, or may have any suitable shape.

The panel 48 includes an interior surface 52 facing the interior 82, and an exterior surface 54 facing the outside environment 84. When the panel assembly 70 is in the closed position, as shown in FIGS. 7A-7C, the interior surface 52 may contact the seal 66.

The latch 50 is disposed on the interior surface 52 and the first catch 40 is disposed on the exterior surface 54. The first catch 40 is spaced from the latch 50. The latch 50 may be disposed on the first portion 56, and the first catch 40 may be disposed on the second portion 58. Alternatively, the latch 50 may be disposed on the second portion 58, and the first catch 40 may be disposed on the first portion 56.

With reference to FIGS. 5 and 7A, the panel 48 may include a window seal 90 disposed on the second portion 58, e.g., on an edge of the panel 48 near the latch 50. The window 88 may engage the window seal 90, as shown in FIG. 7A. For example, the window 88 may compress the window seal 90 when the window 88 is raised. The window seal 90 is configured to allow the door 88 to be opened and closed relative to the rest of the vehicle body 22. The window seal 90 may be formed of any suitable material, for example, rubber, silicone, vinyl, etc. Additionally, the window seal 90 may include a coating of any suitable type and material.

The panel 48 may be formed of any suitable material, for example, glass, polycarbonate, metal (such as aluminum or steel), etc. The panel 48 may be any suitable level of transparency, for example, transparent, partially transparent (e.g., transparent with masking, tinting, etc.), opaque (i.e., solid), etc. The panel 48 may have differing levels of transparency, i.e., one section being more transparent than another section. Different ones of the plurality of panels 48 may have different levels of transparency from the other panels 48.

With reference to FIGS. 3 and 5, the panel 48 may include a side 76. The side 76 may extend around the periphery of the panel 48. When the panel assembly 70 is in the closed position, as shown in FIGS. 7A-7C, the side 76 faces the channel 34. The side 76 extends from the interior surface 52 to the exterior surface 54. The side 76 may extend around the first portion 56, the second portion 58, and the curved portion 72.

The block 62 may be disposed on the side 76. Alternatively, the block 62 may be disposed on the interior surface 52, the exterior surface 54, or on any other suitable location. A distance from the block 62 to the first catch 40 is less than a distance from the block 62 to the latch 50, i.e., the block 62 is positioned closer to the first catch 40 than to the latch 50. For example, when the block 62 is engaged with the channel 34, the panel 48 may rotate about the block axis 64. Because the block 62 is positioned closer to the first catch 40 than to the latch 50, the block axis 64 is also positioned closer to the first catch 40 than to the latch 50. The block axis 64 may be offset from the center of the block 62. For example, when the panel assembly 70 is in the closed position, as shown in FIGS. 7A-7C, a distance from the block axis 64 to the backbone 44 is less than a distance from the center of the block 62 to the backbone 44.

The panel 48 may include a front edge (not numbered) that faces the backbone 44 when the panel 48 is disposed in the opening 24 and the first catch 40 and the second catch 42 are engaged with each other, as shown in FIGS. 7A-7C. The block 62 may abut the front edge of the panel 48, or may be slightly spaced from the front edge. Consequently, the block axis 64 may be slightly spaced from the front edge.

The block 62 may be formed of any suitable material, for example, nylon, plastic, metal, etc. The block 62 may be rotatable relative to the panel 48 in any suitable manner. For example, the block 62 may include a pin (not shown) fixed to the block 62 and rotatably attached to the panel 48. Alternatively, the pin may be fixed to the panel 48 and rotatably attached to the block 62. As another example, a single pin may be engaged with the panel 48 and extend from one block 62 to the other block 62. The pin may be fixed to the two blocks 62 and rotatably attached to the panel 48. Alternatively, the pin may be fixed to the panel 48 and rotatably attached to the two blocks 62.

In light of the foregoing, the operation of the roof assembly 20 will now be described. When the panel 48 may be inserted into the opening 24 (FIG. 6A), the block 62 may be inserted into the slot 32, and engaged with the channel 34. When the panel 48 is in the open position, the block 62 may then be slid along the channel 34 toward the backbone 44, i.e., toward the seated position (FIG. 6B). With the panel in the open position, while the block 62 slides along the channel 34, and before the first catch 40 is engaged with the second catch 42 (FIGS. 6B and 6C), the panel 48 remains spaced from the flange 36 and the seal 66. The block 62 slides along the channel 34 until the first catch 40 is aligned with the second catch 42 in the seated position, with the block 62 near the backbone 44. The panel 48 may then be rotated relative to the block 62 and the vehicle body 22 to the closed position to engage the first catch 40 and the second catch 42 and to engage the panel 48 with the seal 66 (FIGS. 7A-7C). At this point, the first catch 40 and the second catch 42 are engaged with each other, and the latch 50 is now able to be engaged with the vehicle body 22. The handle 38 of the latch 50 may be rotated, pushing the pins 60 toward the vehicle body 22 until the pins 60 engage with the holes 68.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A roof assembly comprising:
    a vehicle body defining an opening and having a track extending along the opening, the track elongated along a track axis;
    a panel removably disposed in the opening;
    a latch attached to the panel and releasably engageable with the vehicle body;
    a catch attached to the panel and spaced from the latch, the catch being designed to removably engage with the vehicle body; and
    a block attached to the panel and removably engageable with the track, the block being rotatable relative to the panel about a block axis perpendicular to the track axis;
    wherein the block is spaced from the latch.

2. The roof assembly of claim 1, wherein the track includes two walls and a channel between the two walls, and wherein one of the walls includes a slot extending into the channel and being designed to receive the block.

3. The roof assembly of claim 2, further comprising a seal, wherein the vehicle body includes a flange extending along the opening and the seal extends between the flange and the panel.

4. The roof assembly of claim 3, wherein the flange and the seal are spaced from the channel.

5. The roof assembly of claim 1, wherein the panel includes a first catch, and the vehicle body includes a second catch, the first catch and the second catch being removably engageable with each other.

6. The roof assembly of claim 5, wherein a distance from the block to the first catch is less than a distance from the block to the latch.

7. The roof assembly of claim 5, wherein the panel includes an interior surface and an exterior surface, and wherein the latch is disposed on the interior surface and the first catch is disposed on the exterior surface.

8. The roof assembly of claim 1, further comprising a notch in one of the panel and the vehicle body, and a boss fixed to the other of the panel and the vehicle body, the notch and the boss being removably engageable with each other.

9. The roof assembly of claim 8, wherein a distance from the block to one of the notch and the boss is less than a distance from the block to the latch.

10. The roof assembly of claim 1, further comprising a seal between the vehicle body and the panel.

11. The roof assembly of claim 1, further comprising a seal, wherein the vehicle body includes a flange extending along the opening, and the seal is between the flange and the panel.

12. The roof assembly of claim 1, wherein the vehicle body includes a backbone and a pair of beams extending in a common direction from the backbone, the backbone and the pair of beams defining the opening.

13. The roof assembly of claim 1, wherein the panel includes a first portion that is planar along the track axis and a second portion extending transversely from the first portion.

14. A vehicle panel assembly comprising:
a panel;
a latch attached to the panel;
a catch on the panel and spaced from the latch, the catch being designed to removably engage with a body of a vehicle; and
a block attached to the panel and rotatable relative to the panel;
wherein the block is spaced from the latch.

15. The vehicle panel assembly of claim 14, wherein the panel includes a first portion, a second portion, and a curved portion curvedly extending from the first portion to the second portion, and wherein the latch is disposed on one of the first portion and the second portion, and the catch is disposed on the other of the first portion and the second portion.

16. The vehicle panel assembly of claim 14, wherein the panel includes an interior surface and an exterior surface, and wherein the latch is disposed on the interior surface and the catch is disposed on the exterior surface.

17. The vehicle panel assembly of claim 14, wherein the block rotates about a block axis, and a distance from the block axis to the catch is less than a distance from the block axis to the latch.

18. The vehicle panel assembly of claim 14, wherein the block rotates about a block axis, the block axis being offset from the center of the block.

19. The vehicle panel assembly of claim 14, wherein the catch is a notch designed to removably engage with a boss of a vehicle.

20. The vehicle panel assembly of claim 14, wherein the panel includes a first edge and a second edge spaced from each other, and further comprising a second block attached to the panel and spaced from the block, the block being adjacent the first edge and the second block being adjacent the second edge, the block and the second block being rotatable relative to the panel about a common block axis, the common block axis extending through the first edge and the second edge, and wherein the catch is between the first edge and the second edge.

* * * * *